(No Model.) 3 Sheets—Sheet 2.
A. I. GRAVIER.
DYNAMO ELECTRIC MACHINE.

No. 561,390. Patented June 2, 1896.

WITNESSES:
K. R. Brennan
Geo. S. Wheelock

INVENTOR
Alphonse Isidore Gravier
BY
ATTORNEYS.

(No Model.) 3 Sheets—Sheet 3.
A. I. GRAVIER.
DYNAMO ELECTRIC MACHINE.
No. 561,390. Patented June 2, 1896.
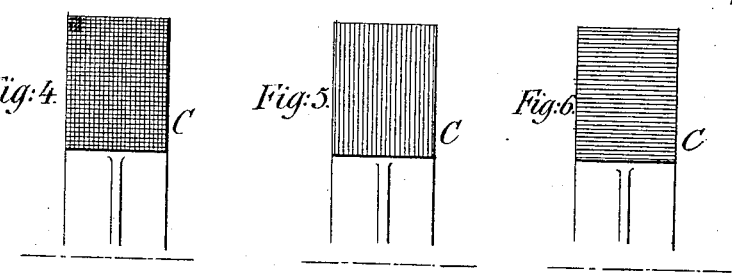
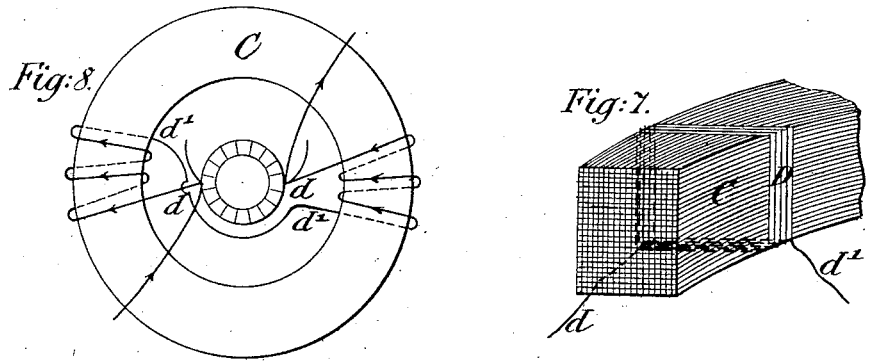
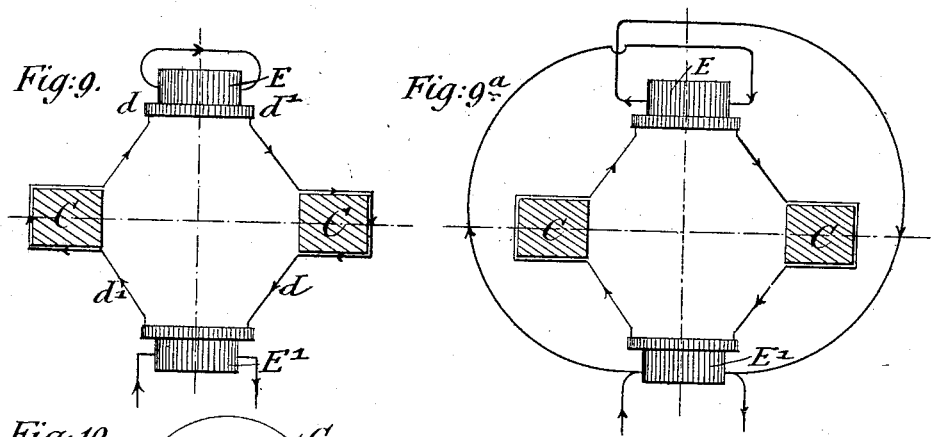
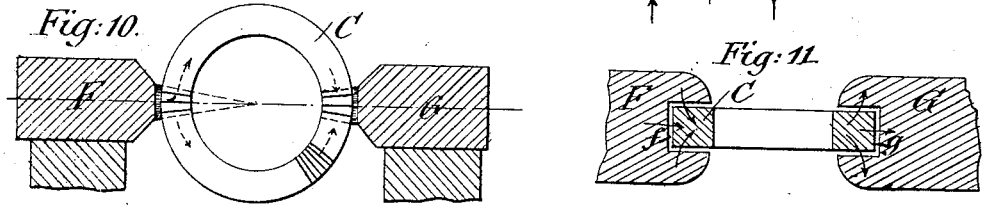
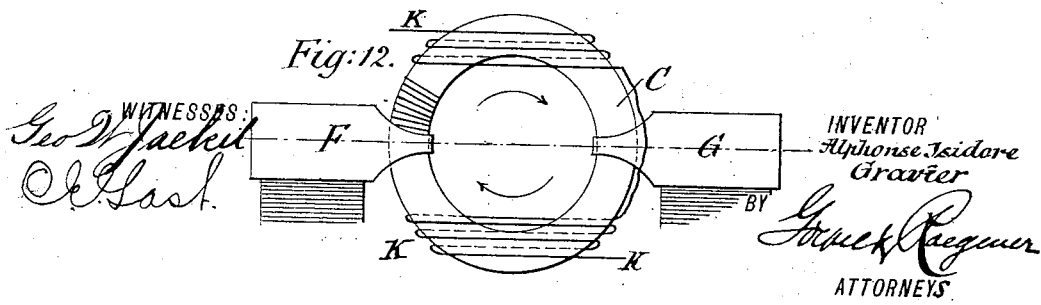
WITNESSES:
Geo. W. Jaekel
C. Gast
INVENTOR
Alphonse Isidore Gravier
BY
Graeme & Raegener
ATTORNEYS

UNITED STATES PATENT OFFICE.

ALPHONSE ISIDORE GRAVIER, OF PARIS, FRANCE.

DYNAMO-ELECTRIC MACHINE.

SPECIFICATION forming part of Letters Patent No. 561,390, dated June 2, 1896.

Application filed April 7, 1894. Serial No. 506,725. (No model.)

*To all whom it may concern:*

Be it known that I, ALPHONSE ISIDORE GRAVIER, a citizen of the Republic of France, residing at Paris, France, have invented certain new and useful Improvements in Dynamo-Electric Machines, of which the following is a specification.

In using dynamo-electric machines it frequently becomes necessary to have great variations in power, either in the production of current or the utilization of the same. This is especially the case in electric traction.

The object of this invention is to provide a new and improved dynamo-electric machine which permits of instantly increasing the electromotive force produced to many times the normal without heating the commutator.

My invention consists, primarily, of an electromagnetic machine which includes an armature having a core, the windings on the same being arranged in sections which are both electrically and mechanically independent of each other and the ends of the windings being connected with opposite plates of the collector. In connection with the armature the pole-pieces of the field-magnets are recessed and provided with inwardly-tapering side pieces which are extended in the direction of the sides of the coil-sections and the faces of which are radially tapering toward the center of the armature. Secondly, my invention comprehends an auxiliary circuit placed in juxtaposition to the upper and lower parts of the armature for the purpose of destroying or neutralizing the magnetic currents produced in the core by the induced current; and my invention also consists of certain features of construction to be hereinafter described, and then particularly claimed.

Figure 1:
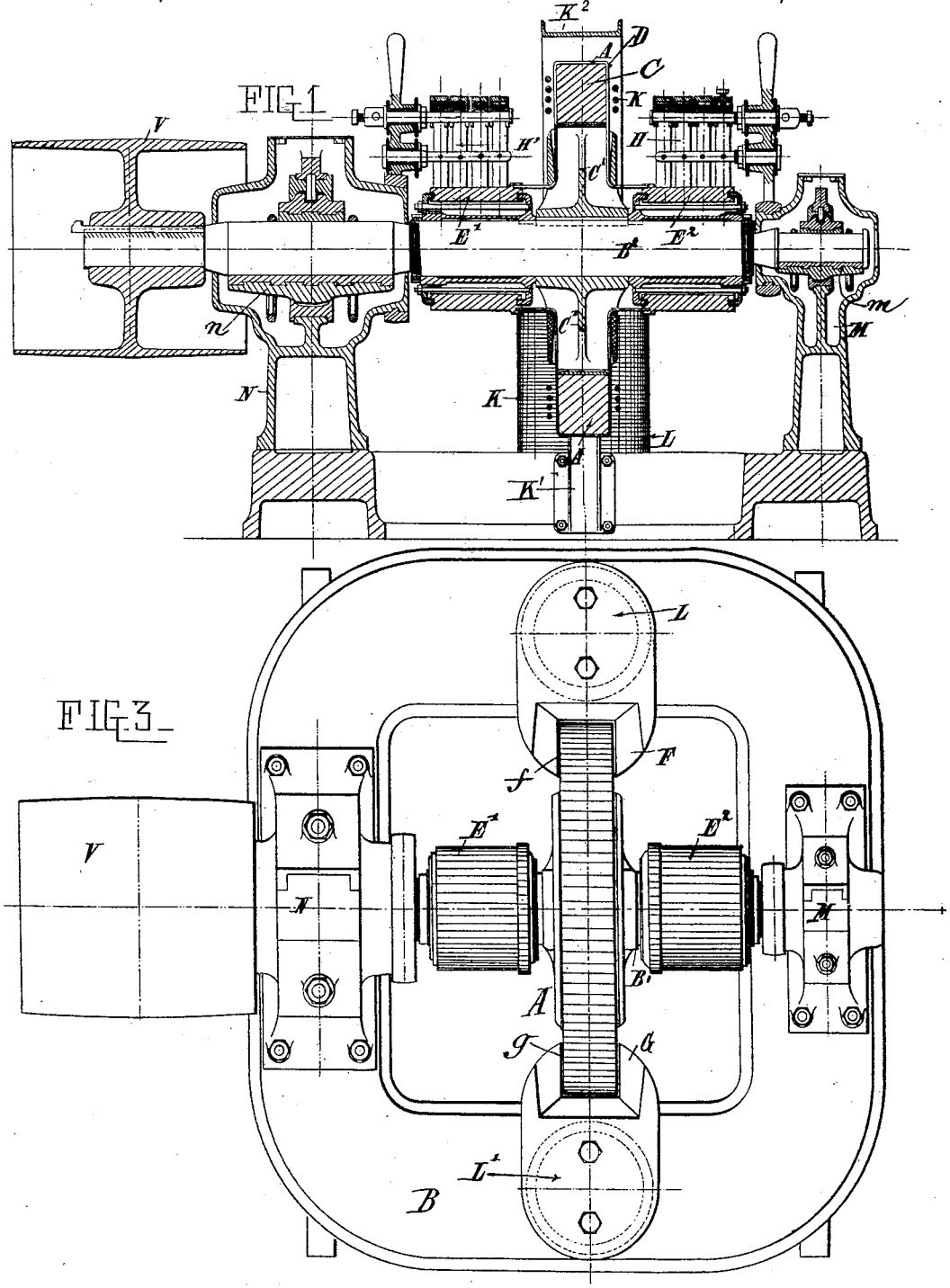
Figure 2:
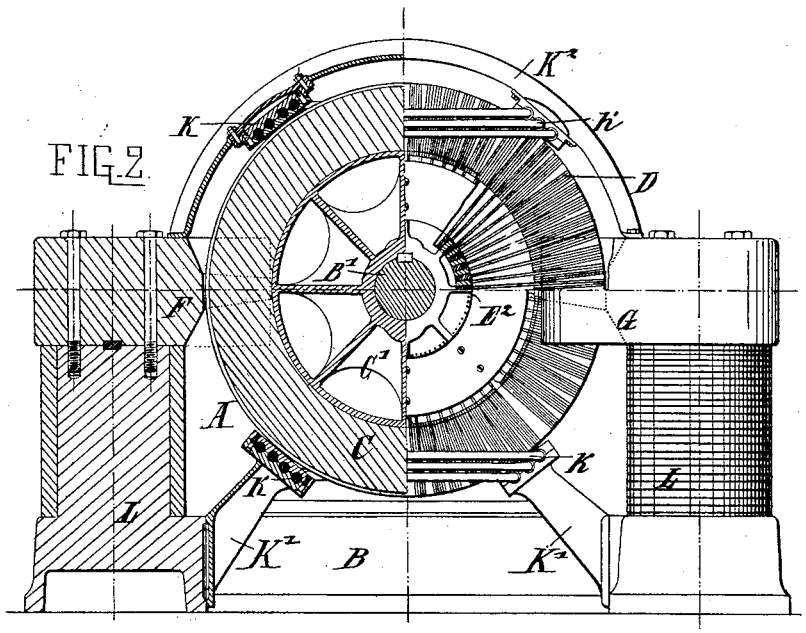
Figure 13:
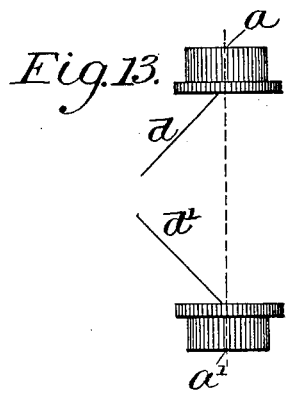

In the accompanying drawings, Figure 1 is a vertical longitudinal section of my improved dynamo. Fig. 2 is a view partly in cross-section and partly in end elevation. Fig. 3 is a plan of the same. Figs. 4, 5, and 6 illustrate various armature-cores which I may employ. Fig. 7 shows diagrammatically the manner of winding one section of the armature on the core. Fig. 8 is a diagrammatic view illustrating the manner of collecting the current when a single collector is used. Fig. 9 is a similar view taken at right angles to Fig. 8, showing the same with a double collector and connected in series. Fig. 9ª is a similar view as Fig. 9, showing the coil-sections of the armature in parallel connection. Figs. 10 and 11 show, respectively, taken at right angles to each other, two constructions of pole-pieces; and Fig. 12 is a diagrammatic view showing the disposition of the circuit which causes the destruction of the magnetic current produced in the armature by the induced current.

Similar letters of reference indicate corresponding parts.

Referring to the drawings, the machine is shown as having a base B, on which are arranged the supports M N, that carry the bearings $m$ $n$ for the steel shaft B' of the armature A. Armature A is rotated through the medium of a pulley V, and comprises, besides its shaft, the ring-shaped core C and the non-magnetic webbed spider C', which is keyed on the shaft and supports the core. Although the core is shown of ring shape, it may be formed in any other suitable shape.

The core C of the armature is, like all cores of imaginary inductors, composed either of coiled iron wire, (Gramme,) Fig. 4, or of iron laminæ, (Siemens,) Fig. 5, or else of coiled iron ribbon, Fig. 6. For the purpose of my invention I prefer the Gramme core, made of iron wire, Fig. 4, as being the most suitable in combination with the pole-pieces which I employ for preventing the Foucault currents. I also prefer that the core C shall have a rectangular cross-section, as shown, which permits of having the coils of wire as long as possible, so as to better utilize the induced copper.

On core C is wound a copper wire in one or two layers, forming an equal number of sections D, independent of each other, both electrically and mechanically, and each having a sufficient length to produce the required electromotive force.

Fig. 7 shows the winding of a section D with five coils, of which the ends are $d$ and $d'$, the one extending to the left and the other to the right of the figure. It is clear, without further explanation, that the core A of the armature can be supplied with a large or small number of sections without in any way connecting them with each other.

I may employ either a single or double collector.

When a single collector E is employed—for instance, a Gramme collector—the two diametrically opposite coil-sections D on the core C are connected in series, as shown in Fig. 8, by attaching their free ends $d\,d$ to two diametrically opposite plates of the collector and connecting their free ends $d'\,d'$ with each other. In this case there is only one current, which is taken off by the brushes, as the coils are connected in series.

When a double collector is used, as shown in Figs. 9 and 9$^a$, each collector is independent of the other. In this case the two ends $d\,d'$ of two diametrically opposite coil-sections are connected with two diametrically opposite plates of one collector, and the other two ends $d\,d'$ of the same coil-sections with two diametrically opposite plates of the other collector, as shown in Fig. 9. The two plates for the two ends $d\,d'$ of each section are located one in the prolongation of the other; in other words, in the same relative position to the axes of the collectors. As each collector is independent of the other, there will be two simultaneous currents, which, like currents from two different sources, can be united either in series or parallel, as shown, respectively, in Figs. 9 and 9$^a$, in which figures the course of the current is indicated by arrows. In the dynamo-electric machine shown in Figs. 1, 2, and 3 a double collector is employed.

The pole-pieces F and G of the field-magnets L are arranged in an entirely different manner to the pole-pieces heretofore employed. In place of enlarging the pole-pieces in a direction at right angles to the convolutions of the induced coil-sections D the pole-pieces F and G are extended in the same direction as the convolutions of the sections D, as shown in Figs. 2 and 3 and in dotted lines in Fig. 10. For this purpose the pole-pieces are provided with tapering side pieces extending toward the sides of the coil-sections, while the faces of the side pieces are made tapering toward the axial center of the core, so that the faces of the pole-pieces diminish gradually in width. These faces of the pole-pieces are made large enough so as to cover three sections D of the armature at a time, the radial tapering of the faces of the pole-pieces corresponding to the radial inclination of the convolutions of the coil-sections D, as shown in dotted lines at the right-hand side of Fig. 2 and in Fig. 10.

In Figs. 3, 11, and 12 the pole-pieces are shown as provided with recesses $f$ and $g$, which inclose three sides of the sections D—that is to say, the outer end and the two opposite sides of the sections, which are rotated close to the bottom and side walls of the recesses. The advantages of this arrangement are, first, that a considerably smaller length of induced wire for each section can be employed than in the method of winding heretofore used; secondly, that in the same proportion as the length of the wire is shortened the resistance of the coil is reduced, which is an important factor; thirdly, that as only three sections at a time are subjected to the action of the pole-pieces the greater portion of the sections D is left uncovered or inactive, so as to permit the free cooling of the greater portion of the sections during the time when they are not subjected to the inductive action of the pole-pieces.

Let the existence of a magnetic field be supposed. The current flows from the north pole to the south pole, following the direction of the dotted arrows. If, while in this excited state, we cause the armature to rotate, each part of the wire which cuts the current will be the seat of an electromotive force which has the following formula: $E = B\,l\,v$, B indicating the specific current; $l$, the length of the wire which cuts the current; $v$, the mean linear speed of the wire cutting the current. Now there are three sections constantly in the north field and in the south field, each of which sections will then furnish an electromotive force, determined by $B\,l\,v$. Outside of the field the other sections will be still induced, but proportionately to the variations of B. Being open, and, further, there being no communication between them, these sections will not be the seat of any current and will consequently cool.

What interests us in particular is the electromotive force produced in the field proper of the pole-pieces F and G. To collect the current which results in them, it is sufficient to place a pair of brushes H and H' on the collectors E' and E$^2$, so as to put them in contact with the plates which correspond to one of the three sections which is in the field. I choose the middle one, for, these three sections being of the same potential, it follows that every section which comes in contact with the brushes, or every section which leaves the brushes being at the same potential as the preceding or following one, there will be no sparking.

One induced section (supposing there be one hundred of them altogether) will only be induced during one-fiftieth of the time employed by one rotation. It is thus heated then during one-fiftieth of the time of rotation and cools during the remaining ninety-nine-fiftieths of the time of a single rotation. If the resistance is not more than one-fiftieth of the total resistance induced in the half of the core C, it is easily understood that there is a possibility of passing through this wire a current which is equal to $1 \times \sqrt{50} \times \sqrt{50}$—that is to say, a current fifty times greater than that of an ordinary machine with the same induced wire—and this without any abnormal heating of the said induced wire.

When the armature A gives out a current by the induced sections D, this current produces a magnetic current in the core A, which hinders the passage of the inducing-current, and a weakening of the electromotive force produced is the result, and this hindrance becomes greater as the flow of current from the armature becomes greater. It is therefore of importance to destroy this current. For this purpose an arched span $K^2$ connects the pole-pieces F G, and brackets K' are located at the lower ends of the field-magnets, so that a circuit K, attached to the said arched span and brackets, may be arranged at the upper and the lower parts of the armature A, forming a fixed number of coils, through which the total current passes.

The number of coils multiplied by the number of amperes which pass through them ought to be equal to the number of ampere-turns of the induced sections, so as to exert a counter-action and neutralize thereby the magnetic induction in the core due to the action of the induced coils thereon.

Having thus described my invention, I claim as new and desire to secure by Letters Patent—

1. The combination, in a dynamo-electric machine, of an armature, the core of which is provided with independent coil-sections arranged in diametrically opposite pairs, of field-magnets having recessed pole-pieces with inwardly-tapering side pieces provided with radially-tapering faces, substantially as set forth.

2. The combination, with an armature, the core of which is made in rectangular cross-section and provided with a number of independent coil-sections arranged in diametrically opposite pairs, of field-magnets, the pole-pieces of which are provided with rectangular recesses, the side pieces of the pole-pieces tapering toward the sides of the coils and the faces of the pole-pieces tapering radially toward the axial center of the core, substantially as set forth.

3. The combination, with a core provided with a series of independent coil-sections arranged in diametrically opposite pairs, of field-magnets provided with recessed pole-pieces, auxiliary coils extending around the upper and lower portions of the armature, and non-magnetic supports for said coils, substantially as set forth.

In testimony whereof I have signed this specification in the presence of two subscribing witnesses.

ALPHONSE ISIDORE GRAVIER.

Witnesses:
CLYDE SHROPSHIRE,
LACOSTE JOSEPH.